(12) United States Patent
Shedletsky et al.

(10) Patent No.: US 8,754,343 B2
(45) Date of Patent: Jun. 17, 2014

(54) ROTARY SLIDE SWITCHES

(75) Inventors: Anna-Katrina Shedletsky, Sunnyvale, CA (US); Samuel Bruce Weiss, Boston, MA (US)

(73) Assignee: Apple Inc., Cupertino, CA (US)

( * ) Notice: Subject to any disclaimer, the term of this patent is extended or adjusted under 35 U.S.C. 154(b) by 1295 days.

(21) Appl. No.: 12/571,268

(22) Filed: Sep. 30, 2009

(65) Prior Publication Data

US 2011/0075328 A1    Mar. 31, 2011

(51) Int. Cl.
*H01H 15/10* (2006.01)

(52) U.S. Cl.
USPC ........................................................ 200/547

(58) Field of Classification Search
USPC ......... 200/308, 536, 547–549, 550, 179, 337, 200/529
See application file for complete search history.

(56) References Cited

U.S. PATENT DOCUMENTS

| 2,662,942 A * | 12/1953 | Winkler .......................... 200/18 |
| 3,643,043 A | 2/1972 | Endow |
| 6,380,501 B1 * | 4/2002 | Figueroa et al. .............. 200/308 |
| 7,248,955 B2 | 7/2007 | Hein et al. |
| 8,399,785 B2 * | 3/2013 | Yahagi ....................... 200/50.18 |

FOREIGN PATENT DOCUMENTS

JP        2006284970 A    10/2006

* cited by examiner

*Primary Examiner* — Renee Luebke
*Assistant Examiner* — Lheiren Mae Caroc
(74) *Attorney, Agent, or Firm* — Dorsey & Whitney LLP

(57) ABSTRACT

Methods and apparatus are provided for reducing the space required by a switch assembly input component of an electronic device. The input component may include a track and a button capable of linear movement within the track. The input component may also include a disk having a slot and a plurality of labels. A pin may be coupled to the button and may extend into the slot for translating the linear movement of the button into rotational movement of the disk. The rotational movement of the disk may alter the portion the labels that are exposed to a user under an open portion of the track. The input component may also include a switch coupled to a portion of the pin extending through the slot of the disk. A switch arm may move along a switch path of the switch in response to the linear movement of the button.

30 Claims, 5 Drawing Sheets

ROTARY SLIDE SWITCHES

FIELD OF THE INVENTION

This can relate to device input components and, more particularly, to slide switch assembly input components having labeled rotary disks.

BACKGROUND OF THE DISCLOSURE

Electronic devices may include at least one of several types of input components to be used by a user for providing instructions or commands to the electronic device. For example, the input component may be a switch assembly including a button that may be moved to at least two different positions. The switch assembly may also include labels associated with each of the button positions. The labels may provide any suitable visible information to a user, including, for example, a value or instruction or color, associated with each button position. The labels may be sequentially displayed such that only the label associated with a particular button position is displayed when the button is in the corresponding position, or such that only the label associated with a particular button position is completely displayed when the button is in the corresponding position and other labels may only be at least partially displayed, for example.

If the switch assembly is a linear switch assembly including a button that may be moved to at least two different positions within a linear slot, for example, the switch assembly may include labels extending from one or more sides of the button. As the user then moves the button within the slot, the labels on one or more sides of the button may be displayed within the slot (e.g., as the button is placed against one end of the slot, the label adjacent to the slot may be visible to the user).

However, labels extending from one or more sides of a button often limit how close the switch assembly may be placed to an edge of the electronic device or to another component of the device. For example, because the label that may be displayed when the button is positioned away from an edge of the device may need to be hidden when the button is positioned adjacent that edge of the device, the slot and button may need to be positioned away from the edge at a distance at least equal to the length of the label. Therefore, the device is generally made significantly larger and/or the switch assembly is made significantly smaller.

SUMMARY OF THE DISCLOSURE

Slide switch assembly input components having labeled rotary disks and methods for creating the same are provided.

According to some embodiments, a user input component for a device is provided. The input component may include a track and a button capable of linear movement within the track. The input component may also include a disk including a slot and labels. A pin may be coupled to the button and may extend into the slot of the disk. The pin may be operative to translate the linear movement of the button into rotational movement of the disk. The rotational movement of the disk may position a portion of the labels under an open portion of the track. In some embodiments, the input component may also include a switch having a switch path and a switch arm. The pin may be operative to translate the linear movement of the button into movement of the switch arm along the switch path.

According to other embodiments, an electronic device is provided that includes a housing and an input component. The input component may include a track in a first wall of the housing, a button operative to move within the track, and a disk having a slot and a first label. The input component may also include a pin coupled to the button and extending into the disk slot. The pin may be operative to rotate the disk in a plane parallel to the first wall of the housing based on the movement of the button for changing the portion of the first label positioned underneath the track. In some embodiments, the input component may also include a switch coupled to the pin and operative to move in a linear path based on the movement of the button for changing an operational state of the device.

According to yet other embodiments, a method for switching a state of a device is provided. The method may include sliding a button in a linear motion along a track, translating the linear motion into a rotational motion, revealing a portion of labels with the rotational motion, and moving a switch with the linear motion. In some embodiments, the translating may include moving a pin with the linear motion along a slot in a rotary disk. The pin may be coupled to the button and the labels may be provided on a surface of the rotary disk.

According to yet still other embodiments, a method for assembling an input component is provided. The method may include forming a linear opening through a wall, positioning a button at least partially within the opening, positioning a disk having labels underneath the opening, and providing a pin between the button and a slot in the disk. In some embodiments, the method may also include positioning a circuit board underneath the disk, coupling a switch to the circuit board, coupling a first end of the pin to the button, coupling a second end of the pin to the switch, and positioning a first middle portion of the pin through the slot in the disk. A second middle portion of the pin may be positioned through a passageway in the circuit board.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which.

DETAILED DESCRIPTION OF THE
DISCLOSURE

Methods and apparatus for reducing the space required by a switch assembly are provided and described with reference to FIGS. 1-4C.

FIGS. 1-4C show various portions of an exemplary electronic device 100 including a switch assembly 200 in various stages of actuation. The term "electronic device" can include, but is not limited to, music players, video players, still image players, game players, other media players, music recorders, video recorders, cameras, other media recorders, radios, medical equipment, domestic appliances, transportation vehicle instruments, musical instruments, calculators, cellular telephones, other wireless communication devices, personal digital assistants, remote controls, pagers, computers (e.g., desktops, laptops, tablets, servers, etc.), monitors, televisions, stereo equipment, set up boxes, set-top boxes, boom boxes, modems, routers, keyboards, mice, speakers, printers, and combinations thereof. In some embodiments, electronic device 100 may perform a single function (e.g., a device dedicated to playing music) and, in other embodiments, electronic device 100 may perform multiple functions (e.g., a device that plays music, displays video, stores pictures, and receives and transmits telephone calls).

Electronic device 100 may generally be any portable, mobile, hand-held, or miniature electronic device having a switch assembly. Miniature electronic devices may have a form factor that is smaller than that of hand-held personal media devices, such as an iPod™ Shuffle available by Apple Inc. of Cupertino, Calif. Illustrative miniature electronic devices can be integrated into various objects that include, but are not limited to, watches, rings, necklaces, belts, accessories for belts, headsets, accessories for shoes, virtual reality devices, other wearable electronics, accessories for sporting equipment, accessories for fitness equipment, key chains, or combinations thereof. Alternatively, electronic device 100 may not be portable at all.

Electronic device 100 may include at least one input component (see, e.g., switch assembly 200 of FIG. 1) that can allow a user to manipulate at least one function of the device, at least one output component (see, e.g., output component 300 of FIG. 1) that can provide the user with valuable device generated information, and at least one protective housing (see, e.g., housing 400 of FIG. 1) that can at least partially enclose the one or more input components and the one or more output components of the device.

Figure 1:
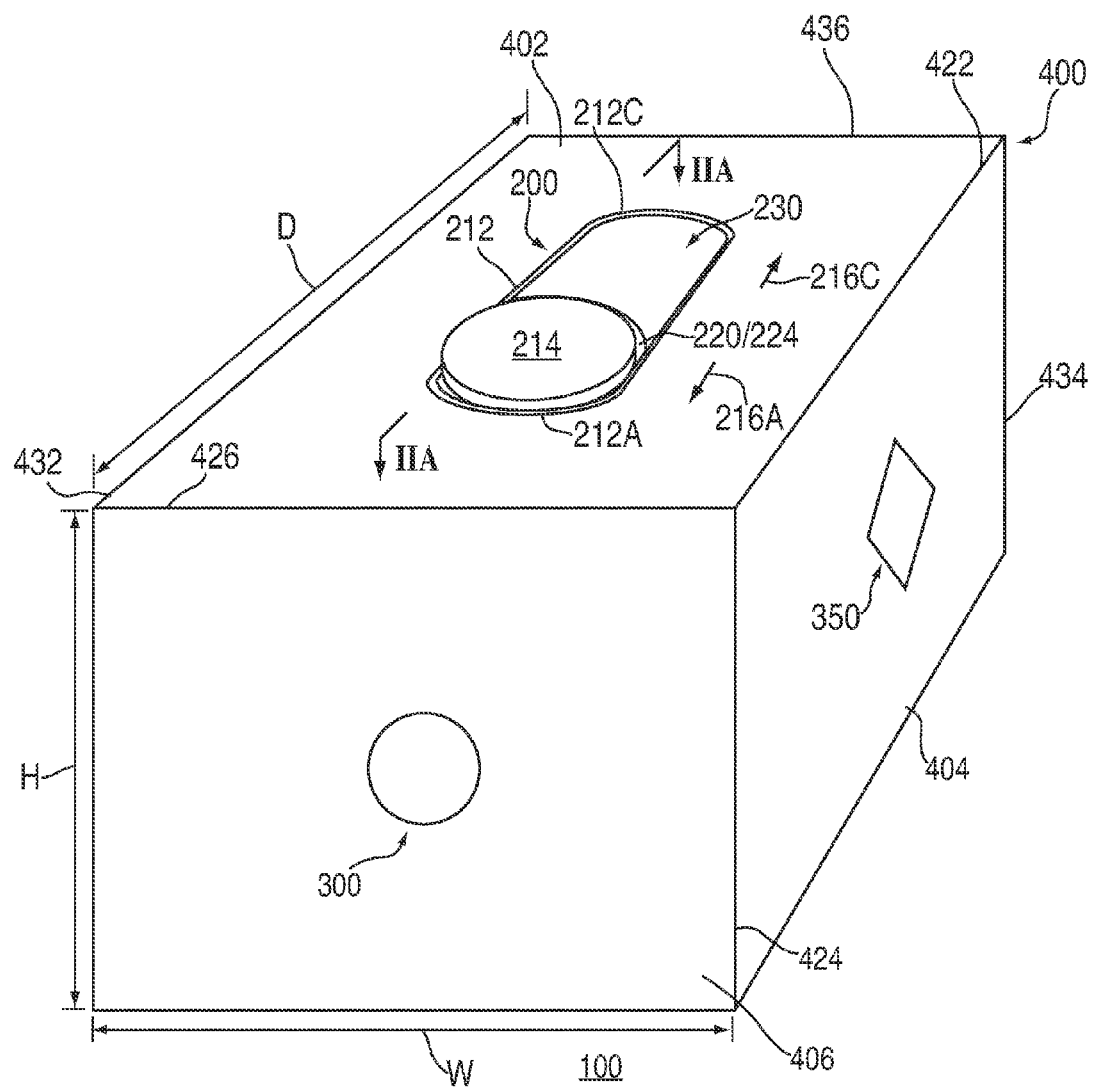
FIG. 1 is a top, front, right perspective view of an electronic device having a switch assembly, in a first stage of actuation, in accordance with some embodiments of the invention.

As shown in FIG. 1, for example, housing 400 of device 100 can be hexahedral and may include a top wall 402, a bottom wall (not shown) opposite top wall 402, a right side wall 404, a left side wall (not shown) opposite right side wall 404, a front wall 406, and a back wall (not shown) opposite front wall 406. While each of the walls of housing 400 may be substantially flat (see, e.g., top wall 402), the contour of one or more of the walls of housing 400 can be at least partially curved, jagged, or any other suitable shape or combination thereof, in order to contour at least a portion of the surface of device 100 to the hand of a user, for example.

Generally, housing 400 may be said to have a depth D that may be defined by the lengths of edges 422 and 432 formed by the intersection of top wall 402 with right side wall 404 and the left side wall, respectively. Similarly, housing 400 may be said to have a width W that may be defined by the lengths of edges 426 and 436 formed by the intersection of top wall 402 with front wall 406 and the back wall, respectively. Finally, housing 400 may be said to have a height H that may be defined by the lengths of edges 424 and 434 formed by the intersection of right side wall 404 with front wall 406 and the back wall. It should be noted that housing 400 of device 100 described above is only exemplary and need not be substantially hexahedral, and that, in certain embodiments, the intersects of certain walls may be beveled, and housing 400 itself could generally be formed in any other suitable shape, including, but not limited to, substantially spherical, ellipsoidal, conoidal, octahedral, or a combination thereof, for example.

Electronic device 100 can include at least one switch assembly input component 200. As shown in FIGS. 1-4C, for example, switch assembly 200 can be a linear sliding switch assembly that may include a linear path or track 212 running along and through a portion of top wall 402 of housing 400. It is to be understood that track 212 of switch assembly 200 may be provided along and through any portion of any wall or walls of housing 400 and not just top wall 402.

Figure 2A:
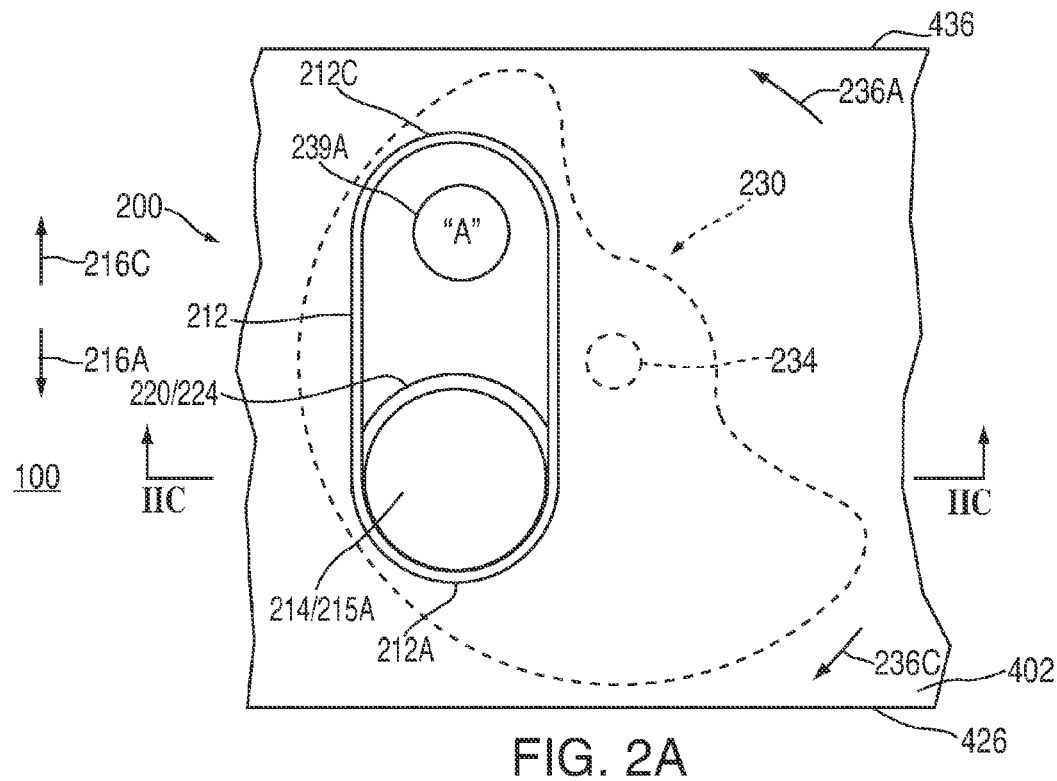
FIG. 2A is a top elevational view of a portion of the electronic device and switch assembly of FIG. 1, in the first stage of actuation, taken from line IIA-IIA of FIG. 1, in accordance with some embodiments of the invention.
Figure 2B:
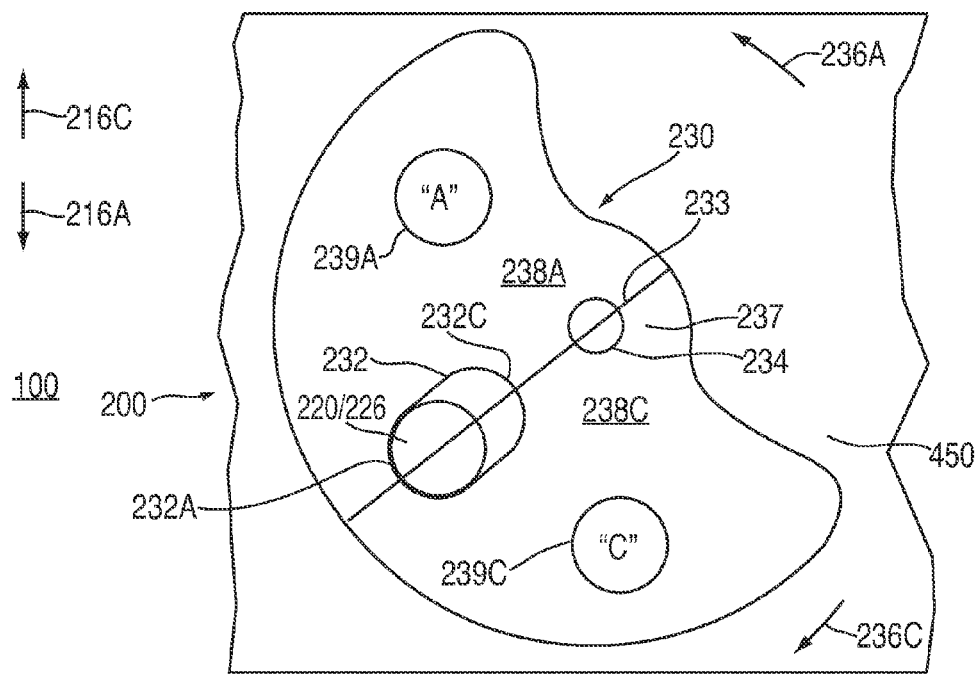
FIG. 2B is a top elevational view of the portion of the electronic device and switch assembly of FIGS. 1 and 2A, in the first stage of actuation, taken from line IIB-IIB of FIG. 2C, in accordance with some embodiments of the invention.
Figure 2C:
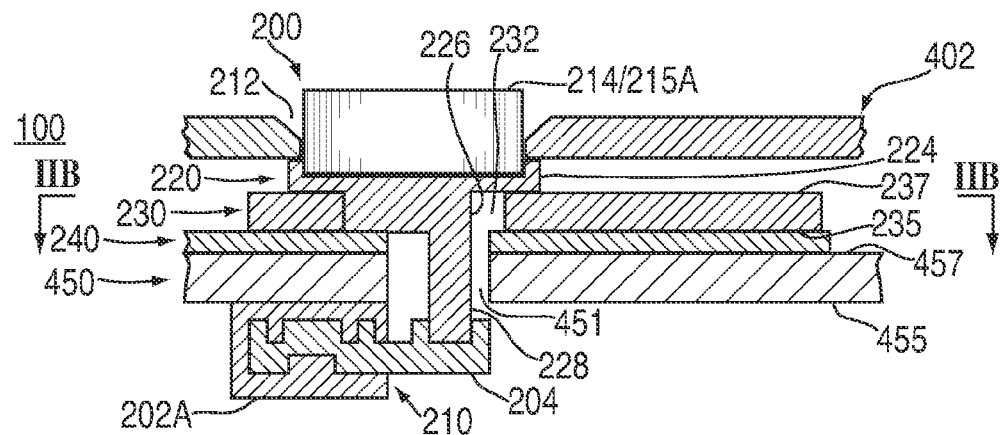
FIG. 2C is a horizontal cross-sectional view of the portion of the electronic device and switch assembly of FIGS. 1-2B, in the first stage of actuation, taken from line IIC-IIC of FIG. 2A, in accordance with some embodiments of the invention.
Figure 3C:
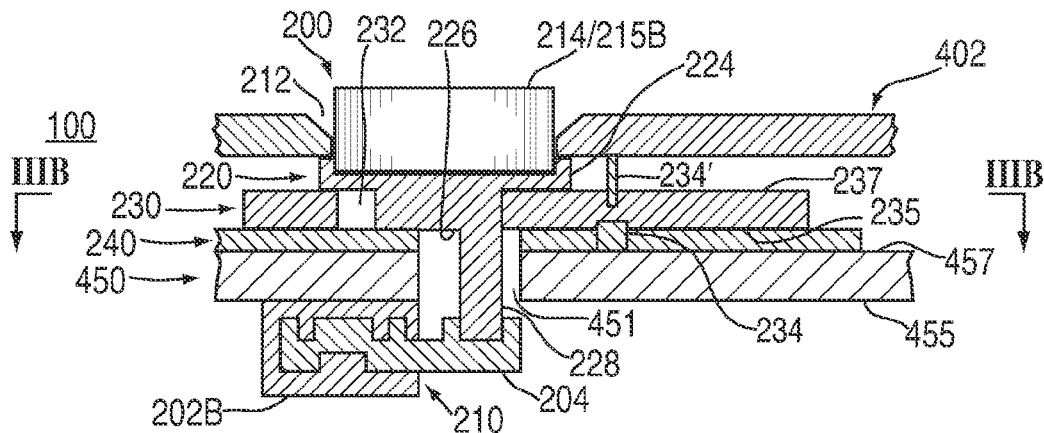
FIG. 3C is a horizontal cross-sectional view of the portion of the electronic device and switch assembly of FIGS. 1-3B, similar to FIG. 2C, but in the second stage of actuation, taken from line IIIC-IIIC of FIG. 3A, in accordance with some embodiments of the invention.
Figure 4C:
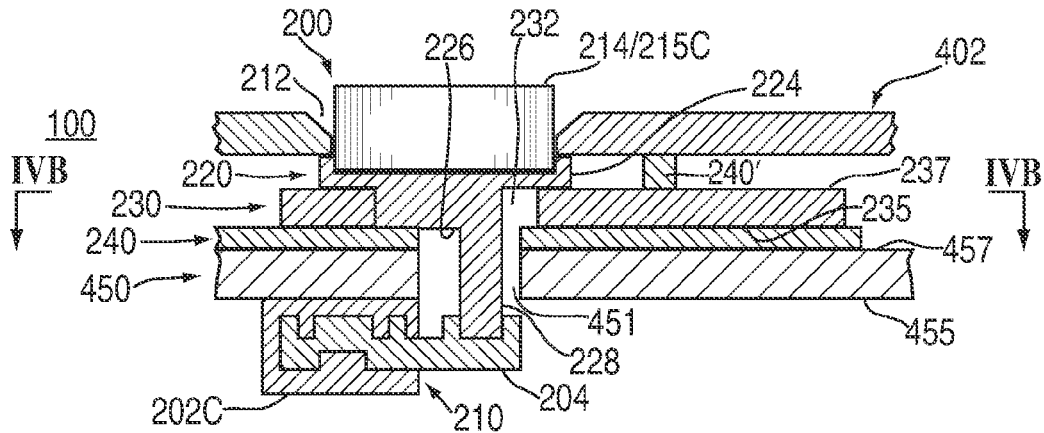
FIG. 4C is a horizontal cross-sectional view of the portion of the electronic device and switch assembly of FIGS. 1-4B, similar to FIGS. 2C and 3C, but in the third stage of actuation, taken from line IVC-IVC of FIG. 4A, in accordance with some embodiments of the invention.
Figure 3A:
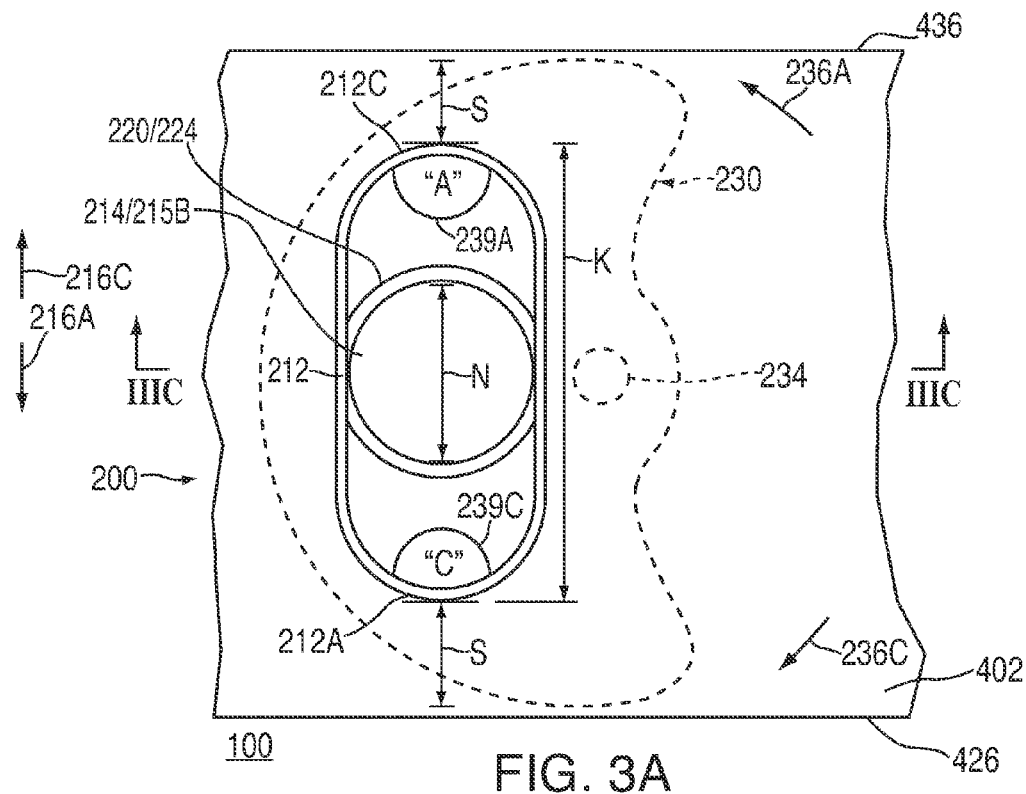
FIG. 3A is a top elevational view of the portion of the electronic device and switch assembly of FIGS. 1-2C, similar to FIG. 2A, but in a second stage of actuation, in accordance with some embodiments of the invention.
Figure 3B:
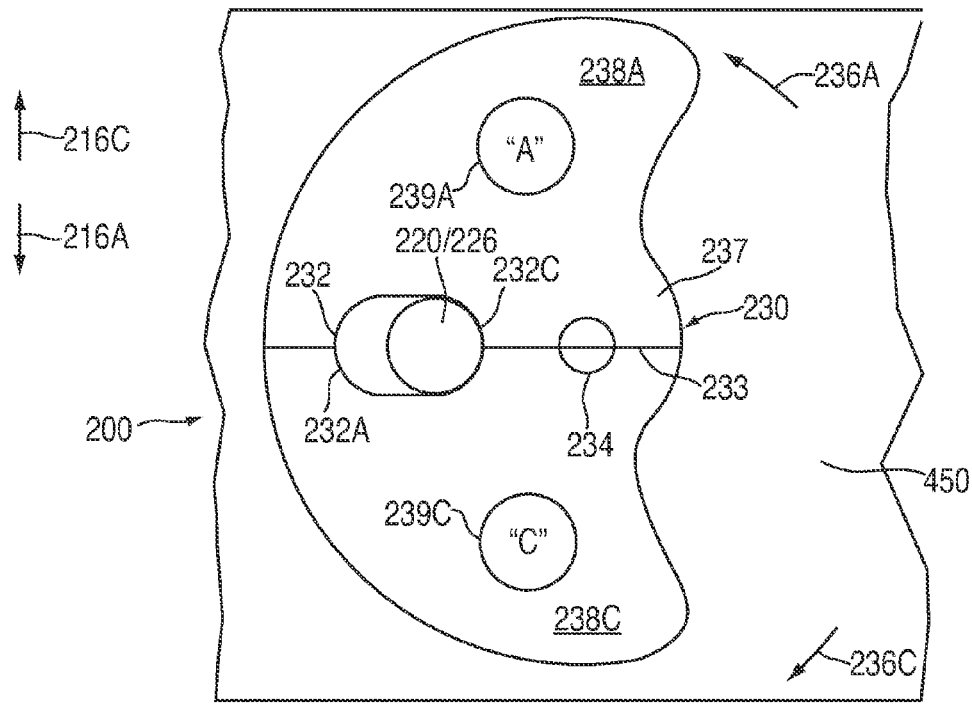
FIG. 3B is a top elevational view of the portion of the electronic device and switch assembly of FIGS. 1-3A, similar to FIG. 2B, but in the second stage of actuation, taken from line IIIB-IIIB of FIG. 3C, in accordance with some embodiments of the invention.
Figure 4A:
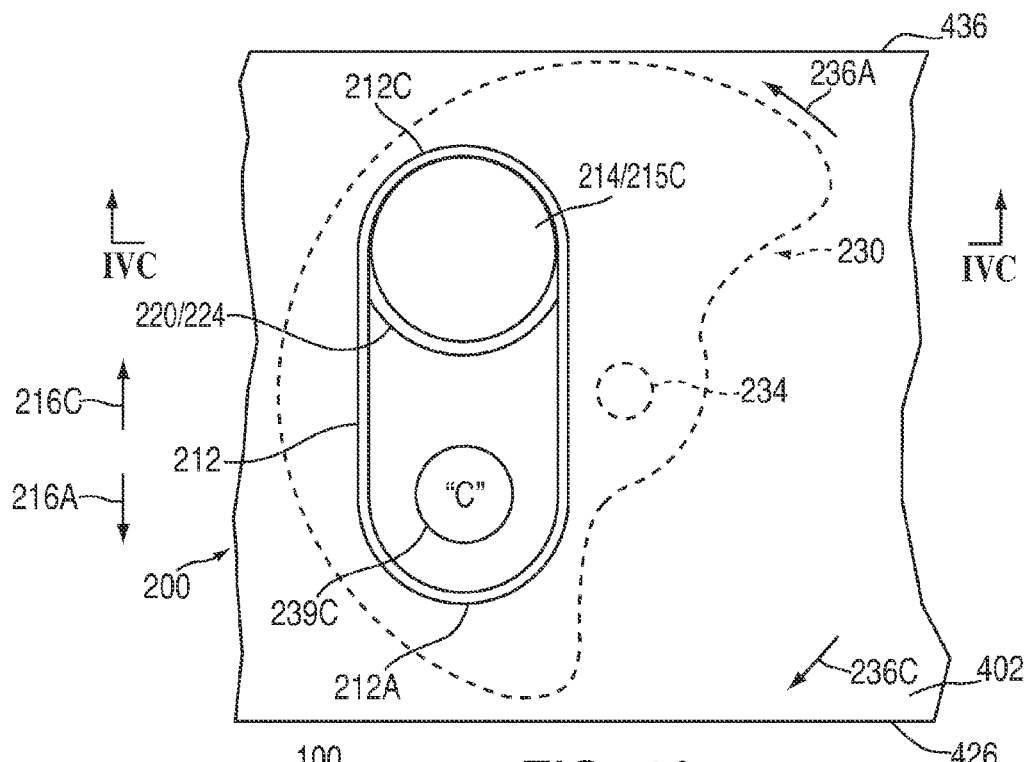
FIG. 4A is a top elevational view of the portion of the electronic device and switch assembly of FIGS. 1-3C, similar to FIGS. 2A and 3A, but in a third stage of actuation, in accordance with some embodiments of the invention.
Figure 4B:
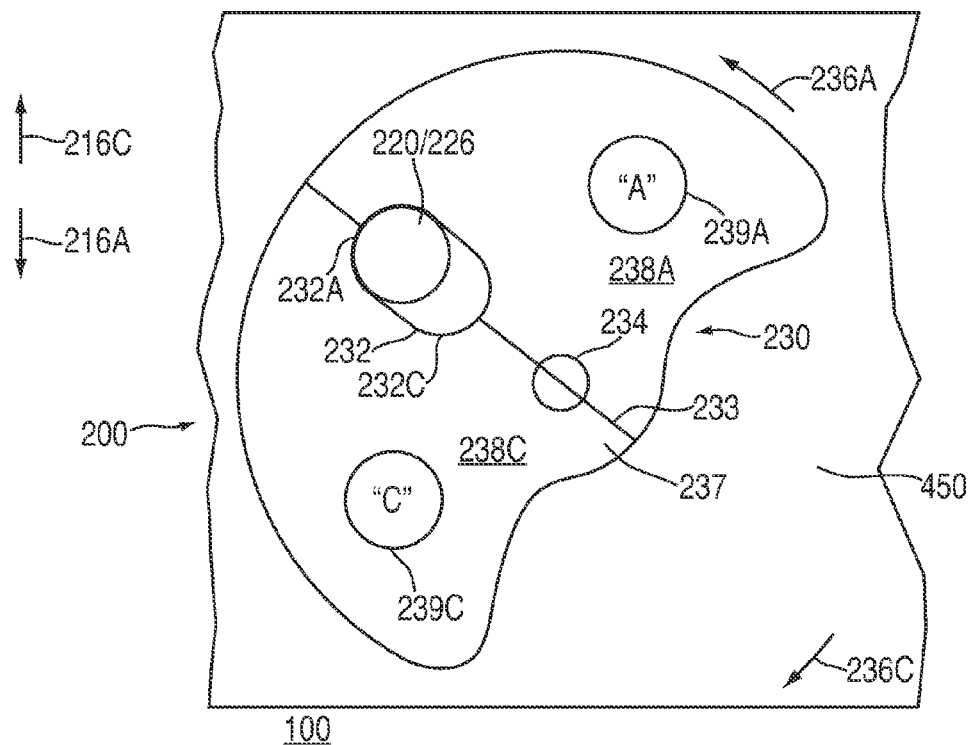
FIG. 4B is a top elevational view of the portion of the electronic device and switch assembly of FIGS. 1-4A, similar to FIGS. 2B and 3B, but in the third stage of actuation, taken from line IVB-IVB of FIG. 4C, in accordance with some embodiments of the invention.

Switch assembly 200 may also include a button 214 that can slide within and along track 212 between at least two button positions to change a functional state of device 100 (e.g., to power the device up or to power the device down). For example, button 214 may slide within track 212 between a first button position adjacent a first end 212A of track 212 (e.g., first button position 215A, as shown in FIGS. 2A-2C) and a second button position adjacent a second end 212C of track 212 (e.g., second button position 215C, as shown in FIGS. 4A-4C). In such embodiments, a user of device 100 can slide button 214 along track 212, either in the linear direction of arrow 216C away from the first button position adjacent first track end 212A and towards the second button position adjacent second track end 212C or in the linear direction of arrow 216A away from the second button position adjacent second track end 212C and towards the first button position adjacent first track end 212A. Additionally or alternatively, in some embodiments, button 214 may slide within track 212 from the first button position adjacent first track end 212A and/or from the second button position adjacent second track end 212C to a third button position in between first track end 212A and second track end 212C (e.g., third button position 215B, as shown in FIGS. 3A-3C) to change a functional state of device 100 (e.g., to hold the device in its current on/off state).

As shown in FIGS. 2C-4C, for example, switch assembly 200 may also include a switch or switch box 210 coupled to button 214. Switch box 210 may be any suitable switching component, such as an electromechanical switching component, that can translate the mechanical movement of button 214 along track 212 into associated electrical signals to be interpreted by other components of electronic device 100 for potentially altering a functional state of device 100. For example, switch box 210 may include a switch arm 204 and two or more switch contact portions 202 (see, e.g., switch contact portion 202A of FIG. 2C, switch contact portion 202B of FIG. 3C, and switch contact portion 202C of FIG. 4C). Switch arm 204 may be coupled to button 214 (e.g., via a pin 220), and switch arm 204 may move along a switch path between different switch contact portions 202 of switch box 210 when button 214 correspondingly moves between different button positions along track 212. Each switch contact portion 202 of the switch path of switch box 210 may be electrically coupled to an electronic component (e.g., a processor (not shown)) of device 100, for example, via a circuit board 450 of device 100. When button 214 is at a functional button position along track 212, switch arm 204 may thereby contact a respective switch contact portion 202 associated with that functional button position, and switch box 210 may thereby change the function or logic of an electronic component of device 200 that is electrically coupled to that switch contact portion 202 (e.g., via circuit board 450 coupled to box 210).

In some embodiments, switch box 210 of switch assembly 200 may be any type of switching component having switch contact portions 202 that may be coupled to button 214 within track 212, including, but not limited to, a single pole single throw ("SPST") switch, a single pole double throw ("SPDT") switch, a single pole center off ("SPCO") switch, a double pole single throw ("DPST") switch, a double pole double throw ("DPDT") switch, a double pole center off ("DPCO") switch, a maintained contact switch, a momentary contact switch, a fader or limitless contact switch, or combinations thereof.

Button 214 of switch assembly 200 can be held within track 212 in various suitable ways such that button 214 may be accessible to a user external to housing 400 for movement along track 212. For example, as shown in FIGS. 2A-4C, pin 220 may extend up from switch arm 204 of switch box 210 and may support button 214 at least partially within track 212. Pin 220 may be coupled to switch arm 204 and/or button 214 in any suitable way, including, for example, adhesives, screws, and contact fits between respective component features. Switch contact portions 202 of switch box 210 may be coupled to a stationary or otherwise fixed portion of device 100 with respect to track 212 through housing 400. For example, switch contact portions 202 may be fixed to portions of a support structure (e.g., circuit board 450), which may be fixed to a portion of housing 400, such that switch arm 204 may move between different switch contact portions 202 in a fixed switch path with respect to housing 400 and, thus, track 212. Therefore, in some embodiments, the switch path of switch 210 may be linear and may substantially match the geometry of track 212.

Button 214 may be moved by a user to one or more functional button positions 215 along track 212. A functional button position of button 214 along track 212 may be a position at which switch arm 204 coupled to button 214 via pin 220 may be in functional contact with a specific switch contact portion 202 associated with that functional button position.

In some embodiments, functional button positions 215 of button 214 along track 212 may be substantially at each one of track ends 212A and 212C of track 212. As shown in FIGS. 2A-2C, for example, when button 214 is located at a first functional button position 215A adjacent first track end 212A, switch arm 204 may be in functional contact with first switch contact portion 202A of switch box 210. Similarly, as shown in FIGS. 4A-4C, for example, when button 214 is located at a second functional button position 215C adjacent second track end 212C, switch arm 204 may be in functional contact with second switch contact portion 202C of switch box 210. In some embodiments, first switch contact portion 202A and second switch contact portion 202C may be electrically coupled to different electronic components or different portions of a particular electronic component of device 100, such that the positioning of button 214 by a user in first functional button position 215A may change a different function or operation of device 100 than the positioning of button 214 in second functional button position 215C.

In some embodiments, switch assembly 200 may additionally or alternatively include one or more functional button positions 215 of button 214 at one or more points along track 212 between first functional button position 215A and second functional button position 215C. As shown in FIGS. 3A-3C, for example, when button 214 is located at a third functional button position 215B substantially half way between first track end 212A and second track end 212C, switch arm 204 may be in functional contact with third switch contact portion 202B of switch box 210. In some embodiments, third switch contact portion 202B may be electrically coupled to a different electronic component or a different portion of a particular electronic component of device 100 than first switch contact portion 202A and/or second switch contact portion 202C, such that the positioning of button 214 by a user in third functional button position 215B may change a different function or operation of device 100 than the positioning of button 214 in first functional button position 215A and/or second functional button position 215C.

Switch assembly 200 may also include a rotary disk 230 positioned underneath track 212. A slot 232 having slot ends 232A and 232C may be provided through disk 230 between a bottom surface 235 of disk 230 and a top surface 237 of disk 230. Disk 230 may be positioned such that top surface 237 may be facing towards track 212. Pin 220 may extend between button 214 and switch box 210 through slot 232 of disk 230. As a user slides button 214 along track 212 between track ends 212A and 212C, a portion of pin 220 (e.g., button pin portion 224) may also slide along track 212, and a portion of pin 220 (e.g., disk pin portion 226) may slide along and within slot 232 of disk 230 underneath track 212 between slot ends 232A and 232C. Movement of disk pin portion 226 of pin 220 along and within disk slot 232 may rotate disk 230 underneath track 212 about disk rotational point 234 in one of two rotational directions. The rotational directions in which disk 230 may rotate (e.g., the rotational direction of arrows 236A and 236C) may be in a plane that is parallel to the portion of housing 400 providing track 212 (e.g., top wall 402).

For example, disk 230 may rotate about disk rotational point 234 in the rotational direction of arrow 236C when button 214 slides along track 212 in the linear direction of arrow 216C (see, e.g., the corresponding rotation of disc 230 in the direction of arrow 236C when button 214 slides in the direction of arrow 216C from button position 215A of FIGS. 2A-2C to button position 215B of FIGS. 3A-3C and/or to button position 215C of FIGS. 4A-4C). As another example, disk 230 may rotate about disk rotational point 234 in the rotational direction of arrow 236A when button 214 slides along track 212 in the linear direction of arrow 216A (see, e.g., the corresponding rotation of disc 230 in the direction of arrow 236A when button 214 slides in the direction of arrow 216A from button position 215C of FIGS. 4A-4C to button position 215B of FIGS. 3A-3C and/or to button position 215A of FIGS. 2A-2C). Disk 230 and disk rotational point 234 are shown in broken lines in each of FIGS. 2A, 3A, and 4A to help illustrate the potential physical relationship between track 212, button 214, and disk 230 as switch assembly 200 is placed in various stages of actuation.

This linear movement of button 214 along track 212 and the corresponding rotational movement of disk 230 underneath track 212 may reveal particular portions of disk 230 to a user through particular portions of track 212. For example, disk 230 may include top surface 237 facing track 212. Top surface 237 may include two or more disc surface portions 238, such as disk surface portion 238A and disk surface portion 238C, which may be provided with one or more labels. For example, disk surface portions 238A and 238C may be defined by the shape of top surface 237 and a line 233 that may extend through slot 232 and rotational point 234. Disk surface portion 238A may include a disk label 239A and disk surface portion 238C may include a disk label 239C. As the user slides button 214 along track 212, certain portions of certain labels 239 under track 212 may be exposed and made visible to the user through track 212. In other embodiments, a disk surface portion 238 may not be provided with a label 239, and the disk surface itself may be revealed through track 212 to convey information.

Each label 239 may be associated with a respective functional button position 215 of button 214 and may be positioned underneath, and thus made visible to a user through, an open portion of track 212 when button 214 is in the functional button position associated with that label. Each label 239 may provide any suitable information to a user, including, for example, a value or instruction or color or texture, that may be associated with a functional button position. For example, as shown in FIGS. 2A-4B, disk label 239A may be represented by the symbol "A" and disk label 239C may be represented by the symbol "C". Labels 239 may be sequentially displayed such that only the label associated with a particular button position 215 may be completely visible to a user through track 212 when the button is in the corresponding position. As mentioned, in some embodiments, a disk surface portion 238 may not be provided with a label 239, and the disk surface itself may be revealed through track 212 to convey information.

For example, as shown in FIGS. 2A-2C, when button 214 is positioned along track 212 at button position 215A, disk pin portion 226 of pin 220 may be positioned within disk slot 232 such that the rotation of disk 230 with respect to track 212 may position disk label 239A of disk surface portion 238A underneath the portion of track 212 not associated with button position 215A. As shown in FIG. 2A, disk label 239A may be exposed through housing 400 by the open portion of track 212 adjacent button 214 (e.g., the portion of track 212 between track end 212C and button 214 at position 215A), and disk label 239C may not be exposed by the open portion of track 212. Similarly, as shown in FIGS. 4A-4C, for example, when button 214 is positioned along track 212 at button position 215C, disk pin portion 226 of pin 220 may be positioned within disk slot 232 such that the rotation of disk 230 with respect to track 212 may position disk label 239C of disk surface portion 238C underneath the portion of track 212 not associated with button position 215C. As shown in FIG. 4A, disk label 239C may be exposed through housing 400 by the open portion of track 212 adjacent button 214 (e.g., the portion of track 212 between track end 212A and button 214 at position 215C), and disk label 239A may not be exposed by the open portion of track 212.

As shown in FIGS. 3A-3C, for example, when button 214 is positioned along track 212 at button position 215B, disk pin portion 226 of pin 220 may be positioned within disk slot 232 such that the rotation of disk 230 with respect to track 212 may position a portion of both disk label 239A of disk surface portion 238A and disk label 239C of disk surface portion 238C underneath portions of track 212 not associated with button position 215C. As shown in FIG. 3A, a portion of disk label 239A may be exposed through housing 400 by the open portion of track 212 between track end 212C and button 214 at position 215B, while a portion of disk label 239C may also be exposed through housing 400 by the open portion of track 212 between track end 212A and button 214 at position 215B. In other embodiments, labels 239 may be positioned on top surface 237 of disk 230 such that no portion of label 239A and/or no portion of label 239C may be exposed through track 212 when button 214 is positioned at button position 215B. Moreover, as shown in FIGS. 2A, 3A, and 4A, button 214 may be coupled to button pin portion 224 of pin 220 such that various portions of button pin portion 224 may be visible to the user as button 214 is moved along track 212. For example, button pin portion 224 of pin 220 may be a flange that can support and surround the bottom of button 214.

Disk 230 of switch assembly 200 can be maintained under track 212 in various suitable ways such that pin 220 may move within disk slot 232 as button 214 slides along track 212. Disk rotational point 234 may be coupled to a stationary or otherwise fixed portion of device 100 with respect to track 212 through housing 400. For example, as shown in FIG. 3C, disk rotational point 234 may be fixed to a portion of a support structure (e.g., circuit board 450), which may be fixed to a portion of housing 400, such that disk 230 may rotate in a fixed path with respect to housing 400 and, thus, track 212. Disk rotational point 234 may extend up from circuit board 450 and may support disk 230 underneath track 212. In other embodiments, disk rotational point 234 may be coupled to housing 400 and may extend downward from housing 400, for example, to support disk 230 (see, e.g., disk rotational point 234' of FIG. 3C).

Moreover, a pad 240 may be provided along at least a portion of a surface of disk 230. Pad 240 may provide a controlled friction region at one or more points along disk 230 to support disk 230 and to control the rotation of disk 230. For example, as shown in FIGS. 2C-4C, pad 240 may be provided underneath disk 230 between bottom surface 235 of disk 230 and circuit board 450. In other embodiments, pad 240 may be provided above disk 230 between top surface 237 and housing 400 of device 100 (see, e.g., pad 240' of FIG. 4C). For example, pad 240 could be a cylindrical boss of a deliberate radius and material, which may allow for the friction between disk 230 and housing 400 or circuit board 450 to be tuned. Pad 240 may be made from any suitable lubricious material (e.g., Delrin® acetal resin) or any suitable sticky material, for example, such that the "sliding feel" of switch assembly 200 may be deliberately controlled. Moreover, the radius or contact area of pad 240 with respect to disk 230 may be changed (e.g., by a user) to alter the "feel" of the sliding action.

As mentioned above, a disadvantage of some conventional switch assemblies is that the labels associated with the various positions of a button often require valuable real estate beyond an end of the track when the button is positioned adjacent that end of the track. However, as shown in FIGS. 1-4B, labels 239 of switch assembly 200 may rotate away from ends 212A and 212C of track 212 in the rotational direction of arrows 236 of disk 230 and may not extend substantially in the linear direction of track 212 beyond track ends 212A and 212C. This may allow for the ends of track 212 to be positioned closer to the edges of a wall of electronic device housing 400 or closer to other components within housing 400.

For example, as shown in FIG. 3A, track 212 of assembly 200 may be centered on top surface 402 of housing 400 between edges 426 and 436. Track end 212A and track end 212C may each be spaced from respective housing edges 426 and 436 by a distance S. In some embodiments, distance S may be in the range of 1.0 millimeter to 1.7 millimeters. In some embodiments, distance S may be in the range of 1.2 millimeters to 1.5 millimeters. In some embodiments, distance S may be about 1.35 millimeters. Of course, distance S can be widely varied and is not limited to these examples. For example, distance S can be less than 1.0 millimeter.

As also shown in FIG. 3A, button 214 may have a width N. In some embodiments, width N may be in the range of 2.0 millimeters to 3.4 millimeters. In some embodiments, width N may be in the range of 2.5 millimeters to 2.9 millimeters. In some embodiments, width N may be about 2.7 millimeters. Of course, width N of button 214 can be widely varied and is not limited to these examples. For example, width N can be less than 2.0 millimeters.

Moreover, as also shown in FIG. 3A, track 212 may have a length K. In some embodiments, length K may be in the range of 4.5 millimeters to 7.3 millimeters. In some embodiments, length K may be in the range of 5.4 millimeters to 6.4 millimeters. In some embodiments, length K may be about 5.9 millimeters. Of course, length K of track 212 can be widely varied and is not limited to these examples. For example, length K can be less than 4.5 millimeters.

As shown in FIGS. 2C-4C, for example, electronic device 100 may include circuit board 450. In some embodiments, circuit board 450 may be any suitable support structure capable of physically supporting one or more components of device 100 (e.g., switch box 210). In other embodiments, circuit board 450 may be a central or primary printed circuit board ("PCB") of electronic device 100, and may also be known as a main circuit board, motherboard, mainboard, baseboard, system board, planar board, or logic board. Circuit board 450 may provide one or more attachment points to the other electronic components of electronic device 100 (e.g., switch box 210). For example, as shown, contact portions 202 of switch box 210 may be coupled to a bottom surface 455 of circuit board 450, and a portion of pin 220 (e.g., switch pin portion 228) may extend through a passageway 451 in circuit board 450 and may couple with switch arm 404 of switch box 210. In other embodiments, switch box 210 may be coupled to a top surface 457 of circuit board 450 and pin 220 may not extend through circuit board 450.

Generally, most of the basic circuitry and components required for electronic device 100 to function may be onboard or coupled (e.g., via one or more cables, bond pads, leads, terminals, cables, wires, contact regions, etc.) to circuit board 450. For example, electronic components may be mounted or otherwise coupled to top surface 457 and/or bottom surface 455 of circuit board 450. Such electronic components may include, but are not limited to, a processor (not shown), a storage device (not shown), communications circuitry (not shown), a bus (not shown), and a power supply (not shown), each of which may be coupled to circuit board 450, for example. Each component may be electrically coupled to a respective terminal, bond pad, or other type of board contact region of circuit board 450. Each one of the board contact regions may be coupled to one or more signal planes, vias, or other circuitry (not shown) of circuit board 450.

A bus of device 100 can provide a data transfer path for transferring data, to, from, or between at least the processor, the storage device, and the communications circuitry. A processor of device 100 can control the operation of many functions and other circuitry of device 100. For example, a processor can receive user inputs from input component 200 and/or input component 350 and drive output component 300.

A storage device of device 100 can include one or more storage mediums, including, for example, a hard-drive, a permanent memory such as read only memory ("ROM"), a semi-permanent memory such as random access memory ("RAM"), or cache, that may store media (e.g., music and video files), software (e.g., for implementing functions on device 100), wireless connection information (e.g., information that may enable device 100 to establish wireless communication with another device or server), subscription information (e.g., information that keeps track of podcasts, television shows, or other media that the user subscribes to), and any other suitable data.

Communications circuitry of device 100 can include circuitry for wireless communication (e.g., short-range and/or long-range communication). For example, wireless communication circuitry of device 100 can be Wi-Fi enabling circuitry that permits wireless communication according to one of the 802.11 standards. Other wireless protocol standards could also be used, either in alternative or in addition to the identified protocol. Another network standard may be Bluetooth™. Communications circuitry can also include circuitry that enables device 100 to be electrically coupled to another device (e.g., a computer or an accessory device) and communicate with that other device. Furthermore, additional electrical components (not shown) can be provided by device 100 for sending and receiving media, including, but not limited to, microphones, amplifiers, digital signal processors ("DSPs"), image sensors (e.g., charge coupled devices ("CCDs")) or optics (e.g., lenses, splitters, filters, etc.), antennas, receivers, transmitters, transceivers, and the like.

In certain embodiments, electronic device 100 may also include at least one user input component that may be of a variety of forms other than that of a switch assembly (see, e.g., switch assembly 200 of FIGS. 1-4C). For example, as shown in FIG. 1, device 100 may also include one or more additional input components 350 that may take other various forms, including, but not limited to, buttons, keypads, dials, scroll wheels, touch screen displays, electronics for accepting audio and/or visual information, antennas, infrared ports, or combinations thereof.

According to some embodiments, the position of one or more of input components 200 and/or 350 may be widely varied relative to the position of another one or more of input components 200 and/or 350. For example, they can be adjacent one another or spaced apart. Additionally, each one of the one or more input components 200 and/or 350 can be placed at any external surface (e.g., top, side, front, or back) of housing 400 that may be accessible to a user during manipulation of electronic device 100.

Furthermore, in certain embodiments, each one of the one or more input components 200 and/or 350 of device 100 may be configured to provide one or more dedicated control functions for making selections or issuing commands associated with operating device 100. By way of example, in the case of a music file player, the switch assembly functions of switch assembly input component 200 can be associated with powering up or down the device, opening or closing a menu, playing or stopping a song, changing a mode, and the like.

As mentioned with respect to FIG. 1, certain embodiments of electronic device 100 may also include at least one device output component 300 that can provide the user with valuable device generated information. For example, output component 300 may take various forms, including, but not limited to, audio speakers, headphones, audio line-outs, visual displays, antennas, infrared ports, or combinations thereof.

Furthermore, in some embodiments, each one of the one or more switch assembly input components 200 can be integrated with some other input component 350 and/or output component 300 of electronic device 100, such as switches, push-buttons, keys, dials, trackballs, joysticks, touch pads, touch screens, scroll wheels, displays, microphones, speakers, cameras and the like. Each of these individual interfaces may include switch assemblies either incorporated therein, such as a switch assembly on a joystick, or forming an integral part thereof, such as a switch assembly with a push-button thereon.

While there have been described switch assembly input components having labeled rotary disks, it is to be understood that many changes may be made therein without departing from the spirit and scope of the invention. It is also to be understood that various directional and orientational terms such as "up" and "down," "front" and "back," "left" and "right," "top" and "bottom," "above" and "under," and the like are used herein only for convenience, and that no fixed or absolute directional or orientational limitations are intended by the use of these words. For example, the devices of the invention can have any desired orientation. If reoriented, different directional or orientational terms may need to be used in their description, but that will not alter their fundamental nature as within the scope and spirit of the invention. Moreover, it is also to be understood that various types of devices, other than electronic devices, may be provided with one or more switch assemblies of the invention. For example, any mechanical device, such as a board game, may be provided with switch assemblies of the invention.

Those skilled in the art will appreciate that the invention can be practiced by other than the described embodiments, which are presented for purposes of illustration rather than of limitation.

What is claimed is:

1. A user input component for a device, the input component comprising:
    a track, wherein the track is an opening through a wall of a housing component;
    a button capable of linear movement within the track;
    a disk comprising a slot and a plurality of labels, the disk capable of rotational movement; and
    a pin coupled to the button and extending into the slot, wherein the pin is operative to translate the linear movement of the button into the rotational movement of the disk, and
    wherein the rotational movement positions a revealed portion of the plurality of labels under an open portion of the track.

2. The input component of claim 1, wherein the open portion of the track comprises at least one portion of the track adjacent the button.

3. The input component of claim 1, wherein the button is capable of the linear movement between a first functional position within the track and at least a second functional position within the track.

4. The input component of claim 3, wherein:
    the rotational movement positions a first revealed portion of the plurality of labels under the open portion of the track when the button is in the first functional position; and
    the rotational movement positions a second revealed portion of the plurality of labels under the open portion of the track when the button is in the second functional position.

5. The input component of claim 4, wherein:
    the first revealed portion comprises a first label of the plurality of labels; and
    the second revealed portion does not comprise the first label.

6. The input component of claim 4, wherein:
    the first revealed portion comprises a first label of the plurality of labels; and
    the second revealed portion comprises a second label of the plurality of labels.

7. The input component of claim 6, wherein:
    the rotational movement positions a third revealed portion of the plurality of labels under the open portion of the track when the button is in a third position within the track between the first functional position and the second functional position; and
    the third revealed portion comprises a portion of at least one of the first label and the second label.

8. The input component of claim 7, wherein:
    the open portion of the track comprises:
        a first open region of the track between the button and a first end of the track; and
        a second open region of the track between the button and a second end of the track; and
    the third revealed portion comprises: a portion of the first label positioned under the first open region of the track; and
    a portion of the second label positioned under the second open region of the track.

9. The user input component of claim 1, further comprising a switch, wherein:
    a first portion of the pin is coupled to the button;
    a second portion of the pin is coupled to the switch; and
    a third portion of the pin between the first portion of the pin and the second portion of the pin extends through the slot.

10. The user input component of claim 9, wherein:
    the switch comprises a switch path and a switch arm capable of movement along the switch path; and
    the pin is operative to translate the linear movement of the button into the movement of the switch arm along the switch path.

11. The user input component of claim 10, wherein:
    the switch arm is capable of the movement between a first functional position within the switch path and at least a second functional position within the switch path;
    the device is configured to operate in a first operational state when the switch arm is in the first functional position; and
    the device is configured to operate in a second operational state when the switch arm is in the second functional position.

12. The user input component of claim 9, further comprising a support structure, wherein:
    a top surface of the support structure faces the track;
    the switch is coupled to a bottom surface of the support structure; and
    a fourth portion of the pin between the third portion of the pin and the second portion of the pin extends through a passageway in the support structure between the top surface of the support structure and the bottom surface of the support structure.

13. The user input component of claim 12, wherein the support structure is a circuit board electrically coupled to the switch.

14. The user input component of claim 12, further comprising a pad positioned between the support structure and the disk.

15. The user input component of claim 12, wherein the disk is capable of the rotational movement about a disk rotational element coupled to the top surface of the support structure.

16. The user input component of claim 1, further comprising a pad positioned between the wall of the housing component and the disk.

17. The user input component of claim 1, wherein the disk is capable of the rotational movement about a disk rotational element coupled to the wall of the housing component.

18. The user input component of claim 1, wherein the rotational movement of the disk is within a plane parallel to the wall of the housing component.

19. The input component of claim 1, wherein the button extends beyond the housing component.

20. An electronic device comprising:
a housing comprising a first wall; and
an input component comprising:
 a track in the first wall;
 a button operative to move within the track;
 a disk comprising a slot and a first label, the disk operative to rotate in a plane parallel to the first wall; and
 a pin coupled to the button and extending into the slot, wherein the pin is operative to rotate the disk in the plane based on the movement of the button for changing the portion of the first label positioned underneath the track.

21. The electronic device of claim 20, further comprising a switch coupled to the pin and operative to move in a linear path based on the movement of the button for changing an operational state of the device.

22. The electronic device of claim 21, further comprising a support structure, wherein:
the switch is coupled to a first surface of the support structure; and
the pin extends through the slot and through a passageway in the support structure between the first surface of the support structure and a second surface of the support structure.

23. The electronic device of claim 22, wherein the support structure is a circuit board electrically coupled to the switch.

24. A method for switching a state of a device, the method comprising:
sliding a button in a linear motion along a track, wherein the track is an opening through a wall of a housing component of the device;
translating the linear motion into a rotational motion;
revealing a portion of a plurality of labels with the rotational motion; and
moving a switch with the linear motion.

25. The method of claim 24, wherein the revealing comprises revealing the portion of the plurality of labels through the track.

26. The method of claim 24, wherein the translating comprises moving a pin with the linear motion along a slot in a rotary disk.

27. The method of claim 26, wherein the pin is coupled to the button, and the plurality of labels are provided on a surface of the rotary disk.

28. A method for assembling an input component, comprising:
forming a linear opening through a wall;
positioning a button at least partially within the opening;
positioning a disk comprising a plurality of labels underneath the opening; and
providing a pin between the button and a slot in the disk.

29. The method of claim 28, further comprising:
positioning a circuit board underneath the disk;
coupling a switch to the circuit board;
coupling a first end of the pin to the button;
coupling a second end of the pin to the switch; and
positioning a first middle portion of the pin through the slot in the disk.

30. The method of claim 29, further comprising positioning a second middle portion of the pin through a passageway in the circuit board.

* * * * *